United States Patent  [15] 3,678,083
Dubeck et al.  [45] July 18, 1972

[54] PREPARATION OF CARBOXYLIC ACIDS

[72] Inventors: Michael Dubeck, Birmingham; Ronald L. Shubkin, Oak Park, both of Mich.

[73] Assignee: Ethyl Corporation, New York, N.Y.

[22] Filed: Dec. 8, 1969

[21] Appl. No.: 883,306

[52] U.S. Cl. .......................260/413, 260/408, 260/514 C, 260/537 R
[51] Int. Cl. .......................................................C08h 17/36
[58] Field of Search .............260/413, 514 CO, 533 A, 514 C

[56] References Cited

UNITED STATES PATENTS

| | | |
|---|---|---|
| 3,462,481 | 8/1969 | Rudkovsky et al. ...................260/514 |
| 3,383,398 | 5/1968 | Peck et al. ...........................260/413 |
| 3,064,040 | 11/1962 | Klemchuk..............................260/514 |
| 2,448,368 | 8/1948 | Gresham et al.......................260/533 |

*Primary Examiner*—Lewis Gotts
*Assistant Examiner*—Ethel G. Love
*Attorney*—Donald L. Johnson

[57] ABSTRACT

A process for preparing carboxylic acids from about $C_{10}$ and higher olefins, carbon monoxide, and water using a cobalt catalyst in the presence of a pyridine promoter; such that the pyridine:cobalt molar ratio is from 1:1 to 10:1 is disclosed. The process is carried out in the substantial absence of a ketone or ether solvent.

10 Claims, No Drawings

PREPARATION OF CARBOXYLIC ACIDS

BACKGROUND OF THE INVENTION

This invention is directed to a process for preparing carboxylic acids from olefins, CO, and $H_2O$ using a cobalt catalyst promoted with a small quantity of a pyridine; this process will also be referred to herein as carboxylation or a carboxylation process.

The reaction of olefins, CO, and water using a cobalt catalyst to produce carboxylic acids is known. Carrying out this reaction with low molecular weight olefins (butene) and diolefins (1,5-hexadiene) in the presence of relatively large amounts of pyridine (pyridine:cobalt molar ratio of 200:1) to improve product linearity is also known [N. S. Imyanitov and D. M. Rudkovskii, Zh P Kh, 40, 2,825–2,828, (1967)]. However, when carboxylation of high molecular weight olefins, e.g. dodecene, is attempted in the presence of such large amounts of pyridine, essentially no reaction occurs.

Quite unexpectedly, it has been discovered that by reducing the amount of pyridine substantially (pyridine:cobalt molar ratios of 1:1 to 10:1,) the carboxylation of the higher olefins proceeds at a rapid rate and the product acid obtained is highly linear. Besides providing the benefit of increased rate of reaction and linearity product, the reduction in the quality of pyridine required enhances the commercial prospects of the carboxylation of higher molecular weight olefins.

SUMMARY OF THE INVENTION

A process for preparing carboxylic acids by reacting about $C_{10}$ and higher olefins, water, and carbon monoxide using a cobalt catalyst and a pyridine promoter such that the molar ratio of pyridine:cobalt is from 1:1 up to 10:1 at elevated temperatures and pressures, said reaction being carried out in the substantial absence of ketone or ether-type solvents.

DESCRIPTION OF THE PREFERRED EMBODIMENTS

A preferred embodiment of the invention is a process for preparing carboxylic acids which comprises reacting olefins having about 10 or more carbon atoms with water and carbon monoxide using a cobalt catalyst in the presence of a pyridine promoter such that the molar ratio of said pyridine: cobalt is from 1:1 up to 10:1, at pressures ranging from 1,000 p.s.i. to 3,500 p.s.i., at reaction temperatures ranging from 120° C. up to 180° C., said reaction being carried out in the substantial absence of solvents of the ketone and ether type. Hydrocarbon α-monoolefins are preferred olefin reactants. More preferred catalysts are dicobalt octacarbonyl and its derivatives. Pyridine is a most preferred promoter.

Olefins having about 10 or more carbon atoms are useful in the present invention; the designation $C_{10+}$ may be used herein to indicate such olefins. The term olefin means any organic compound having one non-aromatic carbon-to-carbon double bond. The double bond may be a terminal double bond or an internal double bond. Cyclic compounds as well as acyclic olefins, branched as well as linear olefins are included. Useful olefins may also contain functional groups such as halide, carboxy, nitro and the like, provided that these functional groups do not enter into or adversely effect the production of acids in the process of the present invention. Examples of useful olefins are 6-phenyldecene-1, oleic acid, 4-chloropentadecene-1, 2-ethyldodecene-1, nonadecene-2, tetracosene-3, 5-bromododecene-2, triacontene, 3-nitrodecene-1, and the like. Preferred olefins are the aliphatic hydrocarbon monoolefins. Examples of such preferred olefins are dodecene-1, eicosene-3, octadecene-2, 3,5,7,9-pentamethyldodecene-1, 2-butyloctene-1, cyclododecene, octacosene-8, triacontene-3, heptadecene-4, tetracontene-1, decene-1, 2-hexyloctene-1, 7,9-dimethyldodecene-1, 3-butyloctene-1, hexatriacontene-1, docosene-1, heptacosene-1, tridecene-1, pentadecene-1, undecene-1, eicosene-1, octadecene-1, and the like. Mixtures of olefins are also useful in the present invention.

Commercial mixtures of olefins can also be used in the present process. These commercial olefin mixtures are generally a mixture of various homologous olefins such as $C_{12}$, $C_{14}$, $C_{16}$ olefins; $C_{10}$, $C_{12}$, $C_{14}$ olefins; $C_{13}$, $C_{15}$, $C_{17}$ olefins; $C_{12}$, $C_{13}$, $C_{14}$, $C_{15}$, $C_{16}$ olefins; $C_{22}$, $C_{24}$, $C_{26}$ olefins; $C_{30}$, $C_{32}$, $C_{34}$, $C_{36}$ olefins; $C_{40}$ and higher olefin mixtures and the like. These commercial mixtures are synthesized for example by Ziegler catalyst polymerization of low molecular weight olefins such as ethylene or propylene; by dehydrogenation of suitable paraffins and the like. These commercial olefin mixtures can contain branched as well as straight-chain olefins. The mixed olefins thus obtained might also contain minor amounts of $C_6$-$C_8$ olefins, non-homologous olefins as well as non-olefin components. Such non-olefin components might be paraffins, alkyl halides, and the like; the nature of the non-olefin components is to a great degree dependent on the synthesis route utilized. The mixed olefins obtained from such a commercial synthesis need not be separated into the individual components to be useful. Mixtures of even carbon numbered olefins in the $C_{10}$ to $C_{32}$ carbon range wherein the alpha moiety predominates are useful; such mixtures containing olefins ranging from about $C_{10}$ to about $C_{14}$ are particularly useful. By predominates we mean that more than 50% by weight of the olefins in the mixture are alpha olefins. The alpha olefin configuration in these mixtures includes the vinyl as well as the vinylidene type configuration. Especially preferred olefin mixtures are those prepared by the Ziegler catalyzed polymerization of ethylene.

The catalysts which are used in the present process are cobalt containing catalysts. The effective catalyst is thought to be a hydrido carbonyl complex; and thus any cobalt containing compound, cobalt metal and the like which can yield such a complex under the reaction conditions can be used in the present process. Cobalt salts e.g. cobalt acetate, cobalt chloride, cobalt complexes, and cobalt chelates can be used. Dicobalt octacarbonyl is quite conveniently used. In general, the amount of catalyst which can be employed should be sufficient to provide from about 0.001 to about 0.2 moles of cobalt metal per mole of olefin reactant.

Water is also a reactant in the present process. The amount of water used can be varied. Ordinarily, at least one mole of water per olefin double bond is provided. Using a monoolefin for illustration purposes, the molar ratio of olefin:water can range from 1:1 to 1:6 or higher. Olefin:water molar ratios ranging from 1:2 to about 1:6 are preferred. An olefin:water molar ratio of 1:3 is conveniently used.

The process is ordinarily carried out under pressure. This pressure is primarily due to the carbon monoxide (CO) reactant. Thus, pressures ranging from about 1,000 to 3,500 pounds per square inch (p.s.i.) can be used. Reaction pressures of 1,000 p.s.i. to about 2,000 p.s.i. are preferred.

The process of the present invention is generally carried out at elevated temperatures. Temperatures over about 180° C. are generally used. A preferred reaction temperature range is from about 120° C. to about 180° C. A more preferred reaction temperature range is 140° – 160° C. A most preferred reaction temperature is about 150°C.

The reaction time may be varied. It is dependent to some degree on the other parameters such as pressure, temperature, nature of the reactants. Generally the reaction is carried out for from 15 minutes up to 10 hours or more.

The product obtained in the carboxylation process is a mixture of acid isomers comprising linear acid as well as branched acid. This can be illustrated by the following reaction equation:

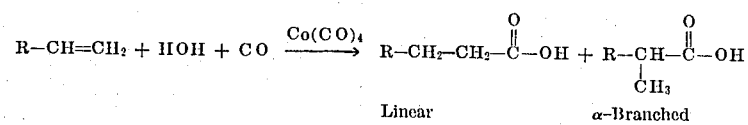

$$\text{R—CH=CH}_2 + \text{HOH} + \text{CO} \xrightarrow{\text{Co(CO)}_4} \underset{\text{Linear}}{\text{R—CH}_2\text{—CH}_2\text{—}\overset{\text{O}}{\overset{\|}{\text{C}}}\text{—OH}} + \underset{\alpha\text{-Branched}}{\text{R—CH—}\overset{\text{O}}{\overset{\|}{\text{C}}}\text{—OH}\atop\underset{\text{CH}_3}{|}}$$

When using a linear α-olefin as one of the reactants under the conditions as heretofore described, the concentration of linear acid in the product ranges around 50%.

A feature of the present invention is the addition of small amounts of a pyridine as a promoter in the process illustrated by the equation above. This promoter not only increases the reaction rate, but also increases the amount of linear acid on the product.

The pyridines which may be used as promoters in the present process include pyridine itself as well as substituted pyridines such as alkyl pyridines (for example, α-picoline, β-picoline, 4-cyclohexylpyridine, 3-isopropylpyridine, the lutidines, 2,4-diethylpyridine), α-bromopyridine, 4-chloropyridine, 3-nitropyridine, 3-cyanopyridine, quinoline, acyl pyridines (e.g. 4-acetylpyridine, 3-butyrylpyridine) and the like. Pyridine is a most preferred promoter.

The concentration of the pyridine is conveniently based on the amount of cobalt present as the cobalt catalyst. Expressed in terms of molar ratio of pyridine:cobalt (in cobalt catalyst), useful promoter ratios are 1:1 to 10:1, with a 5:1 ratio being most preferred. Ratios of pyridine:cobalt higher than this tend to reduce the reaction rate and as will be shown below, quantities of pyridine sufficient to provide molar ratios of pyridine:cobalt of over about 100:1 may completely prevent the carboxylation of $C_{10}$ and higher olefins.

Additionally, the process is characterized by being carried out in the substantial absence of ketone or ether-type solvent. Such solvents are taught in U. S. Pat. No. 2,911,422 to be useful as reaction rate activators for low molecular weight olefins. By ketone or ether solvents is meant liquid alkyl ketones as well as liquid alkylethers having up to about 14 carbon atoms.

The following series of examples will serve to illustrate the present invention. All percentages are by weight unless otherwise indicated. The reactants and promoter were deaerated before use.

EXAMPLE 1

This Example illustrates the carboxylation of a $C_{12}$ olefin in the absence of a pyridine promoter.

An autoclave was charged under nitrogen with 42 grams of dodecene, 13 grams of water and 3 grams of dicobalt octacarbonyl. The autoclave was then sealed and flushed twice with carbon monoxide. The carbon monoxide was then charged to the autoclave. The mixture was heated with stirring to 150°C.; and the pressure at this temperature was 1,750 pounds per square inch (p.s.i.). The reaction was continued at this temperature for three hours. During the course of the reaction, essentially no pressure drop which is indicative of carbon monoxide uptake was observed.

At the end of the three hours, the autoclave was cooled and vented. Analysis of the product by gas liquid chromatography (glc) showed only a trace (less than 0.1%) of carboxylic acid present.

EXAMPLE 2

This Example illustrates the carboxylation of a $C_{12}$ olefin in the presence of a large amount of pyridine. The pyridine:cobalt molar ratio was about 470:1.

An autoclave was charged under nitrogen with 125 millimoles (mmoles) of dodecene-1, 375 mmoles of water, about 1,375 mmoles of pyridine and 2.92 mmoles of $Co_2(CO)_8$. The autoclave was then sealed and flushed twice with carbon monoxide at 250 p.s.i. The carbon monoxide was then charged to the autoclave. The mixture was heated with stirring to 150°C. and the pressure at this temperature was 1,500 p.s.i. The reaction was continued at this temperature for 16 hours. Essentially, no pressure drop was observed during the course of the reaction. This indicates that no carboxylation occurred. At the end of 16 hours, the autoclave was cooled and vented. Analysis of the product by glc showed only a mere trace of carboxylic acid.

EXAMPLE 3

An autoclave was charged with 42 grams of dodecene, 13 grams of water, 8 milliliters (88 mmoles) of pyridine, and 3.0 grams of $Co_2(CO)_8$. The reactants were charged under nitrogen. After charging the autoclave was sealed and flushed twice with carbon monoxide. Carbon monoxide was then charged to the autoclave. The mixture was heated with stirring to 150° C., the pressure at this temperature was 1,900 p.s.i. The reaction was continued at 150°C. for one-half hour.

At the end of this time the autoclave was then cooled and vented. Analysis of the product by glc showed a tridecanoic acid yield of 61.4%, of which 79% was the linear $C_{13}$ acid.

Similar results are obtained when chloropyridine, cyclohexylpyridine, hexylpyridine, β-picoline, 3-acetylpyridine, 4-isopropylpyridine are used in place of pyridine in Example 3; or when cobalt acetylacetonate, cobalt propionate, cobalt nitrate, is used as the catalyst.

The following examples illustrate the process of the present invention. In each case the olefin and water were deaerated by bubbling carbon monoxide through the mixture for five minutes before charging to the autoclave.

EXAMPLE 4

An autoclave was charged with 42 grams of dodecene-1, 13 grams of water, 8 milliliters (88 mmoles) of pyridine, and 3.0 grams of $Co_2(CO)_8$. The reactants were charged under nitrogen. After charging the autoclave was sealed and flushed twice with carbon monoxide. Carbon monoxide was then charged to the autoclave. The mixture was heated with stirring to 150° C., the pressure at this temperature was 1,750 p.s.i. The reaction was continued at 150°C. for 1 hour.

At the end of this time the autoclave was then cooled and vented. Analysis of the product by glc showed a tridecanoic acid yield of 68.4%, of which 78.5% was the linear $C_{13}$ acid.

Similar results are obtained in Example 4 when the following concentrations of pyridine are used: 44 mmoles, 60 mmoles, 176 mmoles, 17.6 mmoles, 130 mmoles.

EXAMPLE 5

An autoclave was charged with 42 grams of dodecene, 13 grams of water, 8 milliliters (88 mmoles) of pyridine, and 3.0 grams of $Co_2(CO)_8$. The reactants were charged under nitrogen. After charging the autoclave was sealed and flushed twice with carbon monoxide. Carbon monoxide was then charged to the autoclave. The mixture was heated with stirring to 150° C., the pressure at this temperature was 1,750 p.s.i. The reaction was continued at 150°C. for 3 hours.

At the end of this time the autoclave was then cooled and vented. Analysis of the product by glc showed a tridecanoic acid yield of 72.8%, of which 78% was the linear $C_{13}$ acid.

Similar results are obtained in Example 5 when the initial CO pressure at the reaction pressure is 1,000 p.s.i., 2,500 p.s.i., 3,500 p.s.i.

The following olefins when used in place of dodecene-1 in Example 5 will yield products analogous to those obtained with the dodecene.

| Olefin | Acid Product |
|---|---|
| 50% α-$C_{16}$, 50% internal $C_{16}$ olefins | $C_{17}$ Saturated acids |
| Decene-1 | Undecanoic acids |
| Octadecene-2 | Nonadecanoic acids |
| Heptadecene | Octadecanoic acids |
| $C_{11}$, $C_{12}$, $C_{13}$ olefin mixture | $C_{12}$, $C_{13}$, $C_{14}$ Saturated acids |
| Pentacosene-1 | Hexacosanoic acids |
| Triacontene-1 | Hentriacontanoic acids |
| Tetradecene-3 | Pentadecanoic acids |
| $C_{40}$ olefin | $C_{41}$ Saturated acids |
| $C_{20}$, $C_{22}$ olefin mixture | $C_{21}$, $C_{23}$ Saturated acids |

Comparable results are obtained in Example 5 when the following reaction temperatures and times are used: 120° C., 140° C., 180° C. for 1.5 hours; 160° C. for 15 minutes.

Data from Examples 1-5 are presented in the Table I below.

The acid products of the present process have many uses, e.g. as chemical intermediates in soap manufacture.

TABLE I

Pyridine Promotion Of $Co_2(CO)_8$ Catalyzed $C_{12}$ Olefin Carboxylation

| Ex. | Pyridine (mmoles) | Pyridine:Cobalt (Molar Ratio) | reaction time (hrs) | $C_{13}$ acid product Yield | Linear |
|---|---|---|---|---|---|
| 1 | 0 | — | 3 | Trace[1] | — |
| 2 | 1375 | 470:1 | 16 | Trace | — |
| 3 | 88 | 5:1 | 0.5 | 61.4% | 79% |
| 4 | 88 | 5:1 | 1 | 68.4% | 78.5% |
| 5 | 88 | 5:1 | 3 | 72.8% | 78% |

(1) The yield is based on 100% conversion of the olefin. From a consideration of the data in the Table above, it is clear that the rate and linearity promoting effect of small quantities of a pyridine on cobalt catalyzed carboxylation of higher molecular weight olefins is readily evident. Without pyridine, essentially no carboxylation of dodecene-1 occurs at 150°C. The addition of relatively large amounts of pyridine (1375 mmoles) has essentially no effect on the carboxylic reaction (Example 2). However, when small amounts (88 mmoles) of pyridine are present, there is a dramatic increase in the rate of the carboxylation reaction and the linearity of the acid product, which is expected to be about 50%, is increased sharply to almost 80%.

Claims to the invention described will follow.

When commercial mixtures of olefins are used, mixtures of acids are produced in the present process. For example, a mixture containing $C_{10}$, $C_{12}$, and $C_{14}$ olefins will produce a mixture of $C_{11}$, $C_{13}$, and $C_{15}$ carboxylic acids. These acids, as with all the acid products prepared by the present process, can be used as such or can be separated by any suitable procedure, before use.

We claim:

1. A process for preparing carboxylic acids by reacting olefin having about ten or more carbon atoms with water and carbon monoxide using a cobalt catalyst in the presence of a pyridine promoter such that the molar ratio of said pyridine:cobalt is from about 1:1 up to about 10:1, at pressures ranging from about 1,000 p.s.i. to about 3,500 p.s.i., at reaction temperatures ranging from 120° C. up to 180° C., said reaction being carried out in the substantial absence of solvents of the ketone and ether type.

2. The process of claim 1 wherein said olefin is hydrocarbon monoolefin.

3. The process of claim 1 wherein said catalyst is dicobalt octacarbonyl.

4. The process of claim 1 wherein said promoter is selected from pyridine, quinoline and substituted pyridines wherein the substituting groups are selected from $C_1$–$C_6$ alkyl, cyano, halo, nitro and $C_2$–$C_4$ acyl.

5. The process of claim 1 wherein said promoter is pyridine.

6. The process of claim 1 wherein said olefin is a mixture of olefins in the range of from about $C_{10}$ to $C_{32}$.

7. The process of claim 6 wherein said olefin mixtures are predominantly α, even carbon number olefins in the range of from about $C_{10}$ to about $C_{14}$.

8. The process of claim 2 wherein said catalyst is dicobalt octacarbonyl, said reaction temperature ranges from about 140° C. to about 160° C., and said pressure ranges from about 1,000 p.s.i. to about 2,000 p.s.i.

9. The process of claim 8 wherein the pyridine:cobalt molar ratio is about 5:1.

10. The process of claim 9 wherein said olefin is dodecene-1.

* * * * *